United States Patent

Thelamon et al.

[11] Patent Number: 5,088,702
[45] Date of Patent: Feb. 18, 1992

[54] HYDRAULIC ANTIVIBRATORY SLEEVES

[75] Inventors: Jean Thelamon, Douy; Jean-Luc Salaud, Conflans Sainte Honorine; Daniel Dubos, Asnieres, all of France

[73] Assignee: Hutchinson, France

[21] Appl. No.: 558,500

[22] Filed: Jul. 27, 1990

[30] Foreign Application Priority Data

Jul. 31, 1989 [FR] France .................. 89 10302

[51] Int. Cl.$^5$ .......................... B60K 5/13; F16F 13/00
[52] U.S. Cl. .................. 267/140.1 C; 267/219
[58] Field of Search .............. 267/140.1 C, 140.1 A, 267/140.1 R, 141, 141.1, 141.2, 219, 136, 35; 248/560, 562, 636

[56] References Cited

U.S. PATENT DOCUMENTS

| | | | |
|---|---|---|---|
| 4,458,888 | 7/1984 | Wolf et al. | 267/140.1 |
| 4,728,086 | 3/1988 | Ishiyama et al. | 267/140.1 |
| 4,884,789 | 12/1989 | Takeda et al. | 267/140.1 |
| 4,962,915 | 10/1990 | Thorn | 267/140.1 |

FOREIGN PATENT DOCUMENTS

| | | |
|---|---|---|
| 0248714 | 12/1987 | European Pat. Off. |
| 0037349 | 2/1984 | Japan ................. 267/140.1 |
| 62-88834 | 4/1987 | Japan . |

*Primary Examiner*—Matthew C. Graham
*Attorney, Agent, or Firm*—Larson and Taylor

[57] ABSTRACT

A hydraulic antivibratory sleeve is disclosed comprising two rigid tubular frames (1, 2), one surrounding the other, and joined together by an elastomer body (3) shaped so as to form therewith at least two diametrically opposite sealed pockets (A, B) communicating together through a narrow channel, the assembly of the pockets and said channel being filled with a damping liquid, the portion of the elastomer body which defines the first pocket (A) having in axial section the general form of a radially outwardly open U or V, the narrow channel being formed of at least two narrow channels (9) each extending, at least approximately and at least partially, along a transverse arc of a circle having as axis the axis of the external tubular frame (2), each arc being situated close to this frame and close to an axial end of said frame. The first pocket (A) is divided into two independent compartments ($A_1$, $A_2$) into which the two narrow channels (9) open respectively assigned respectively to the damping of different oscillation frequencies.

6 Claims, 1 Drawing Sheet

HYDRAULIC ANTIVIBRATORY SLEEVES

The invention relates to hydraulic antivibratory sleeves comprising two rigid tubular frames, one surrounding the other, and which are preferably of revolution at least partially, coaxial and concentric at least under load, which frames are joined together by an elastomer body shaped so as to form therewith at least two sealed pockets diametrically opposite in a direction D and communicating together through a narrow channel, the assembly of said pockets and said channel being filled with a damping liquid.

Such sleeves are intended to be fitted between two rigid parts which can be fixed respectively to the two frames and withstanding, with respect to each other, oscillations oriented in the diametrical direction D, the whole being adapted so that, for some at least of these oscillations, the liquid is driven alternately from one pocket to the other and conversely through the narrow channel, which creates in this liquid, for a given frequency of the oscillations whose value F is related directly to the dimensions of said channel, a resonance phenomenon able to damp the transmission of such oscillations from one to the other of the frames.

The sleeves of the kind in question are for example intended to be inserted between a vehicle chassis and the internal combustion engine or the front or rear undercarriage of this vehicle.

The invention relates more particularly, among the above sleeves, to those in which the portion of the elastomer body which defines one at least of the pockets -which is named "first pocket" thereafter- has in axial section the general form of a radially outwardly open U or V and in which the narrow channel is formed of at least two narrow channels each extending, at least approximately and at least partially, along a transverse arc of a circle having as axis the axis of the external tubular frame, each arc being situated close to this frame and close to an axial end of said frame.

Such sleeves have been described in the patent application EUROPE no. 0 248 714.

In such sleeves, two narrow channels are provided mounted in parallel between a first pocket and the same second pocket.

The overall effect obtained by these two channels is then comparable to that which would be obtained by a single channel in that the sleeve considered essentially damps the oscillations corresponding to a given single frequency.

Now, it may be advantageous to damp oscillations corresponding to two distinct frequencies by means of such a sleeve.

For this, it has already been proposed to replace the single "first pocket" of such a support by two independent "first pockets" communicating respectively with the second pocket through two distinct narrow channels, the dimensions of each channel being provided so as to provide optimum damping of the support for oscillations of a given frequency, and the values $F_1$ and $F_2$ of this frequency being different for the two channels.

In the embodiments which have been proposed for putting this solution into practice, &he adjustments are difficult and the construction is relatively complicated.

The object of the invention is especially to overcome these drawbacks.

For this, advantage is taken of the fact that, in the above described sleeve, two distinct narrow channels are already available connecting the same first pocket—namely the one partially defined by the U or V portion of the elastomer body—to the same second pocket, these two channels extending along two different arcs of the same circle or along two arcs belonging to separate parallel circles: here the first pocket is divided into two independent pockets into which the two narrow channels open respectively and the dimensions of each of these two channels, which dimensions correspond to optimum damping of oscillations of a given frequency, are such that the values $F_1$ and $F_2$ of this frequency are different for the two channels.

Division of the first pocket into two independent pockets is also very simple : in fact, this first pocket is defined, on the one hand, by a portion of the external frame or a thin part added on the inside against this frame and, on the other hand, by a portion of the elastomer body disposed inside said frame and, for dividing said pocket into two, it is sufficient to add to said body a sealed web moulded integrally therewith and extending from its central zone as far as the external tubular frame.

In advantageous embodiments, the second pocket is further divided into two compartments in which the two channels open respectively, this division being formed particularly by a sealed web integrally moulded with the elastomer body and extending from a central portion of this body as far as the external tubular frame.

Apart from these main arrangements, the invention comprises certain other arrangements which are preferably used at the same time and which will be more explicitly discussed hereafter.

In what follows, a preferred embodiment of the invention will be described with reference to the accompanying drawings in a way which is of course in no wise limitative.

DETAILED DESCRIPTION OF DRAWINGS

Figure 1:
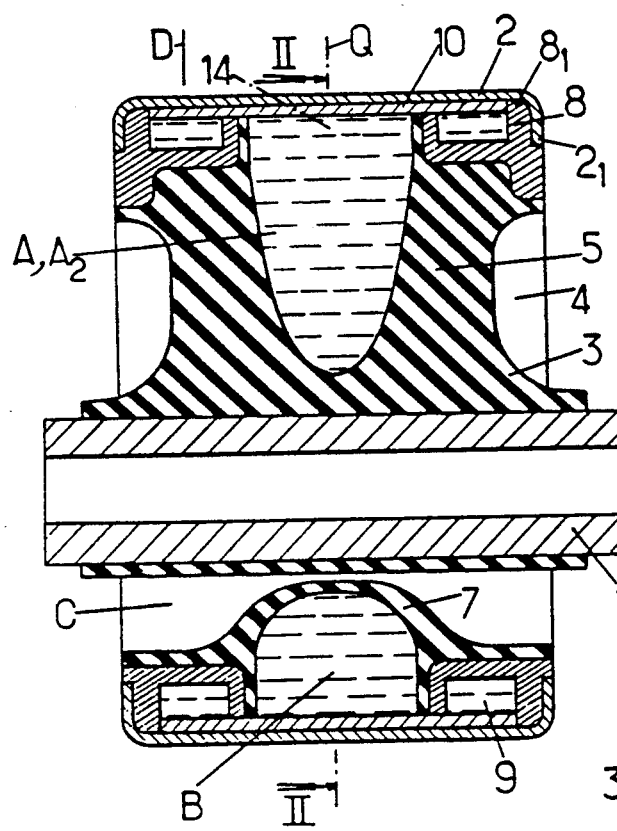
FIGS. 1 and 2 of these drawings show a hydraulic antivibratory sleeve constructed in accordance with the invention, respectively in axial section through I—I of FIG. 2 and in cross section through II—II of FIG. 1.
Figure 3:
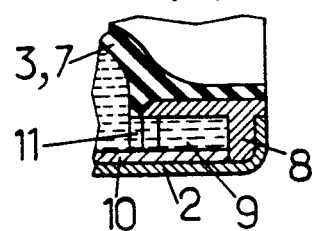
FIG. 3 is a partial axial section of the same sleeve through III of FIG. 2.

The sleeve in question comprises:
an internal tubular metal frame of revolution 1,
an external tubular frame of revolution 2 which surrounds frame 1 and which, for the mounted and loaded condition of the sleeve, may be coaxial with this frame 1, the axes of the two frames being in any case parallel to each other in the rest condition of the sleeve, and
an elastomer body 3 connecting the two frames 1 and 2 together while forming therebetween two sealed pockets A, B diametrically opposite in direction D.

The internal frame 1 is intended to be fixed to a pin (not shown) which passes jointingly therethrough whereas the external frame 2 is intended to be fixed to a bearing (not shown), this pin and this bearing being integral respectively with two rigid elements between which it is desired to fit an antivibratory support, which elements may be an engine or suspension arm of a vehicle and the chassis of this vehicle.

A portion of body 3, which is assumed here purely by way of illustration to be its upper half, has under load a form partially of revolution about the axis common to the two frames 1 and 2, with an axial half section in the form of a U or V, two outwardly axially open grooves 4 of the sleeve being formed in the two front faces 5 of said portion.

Figure 2:
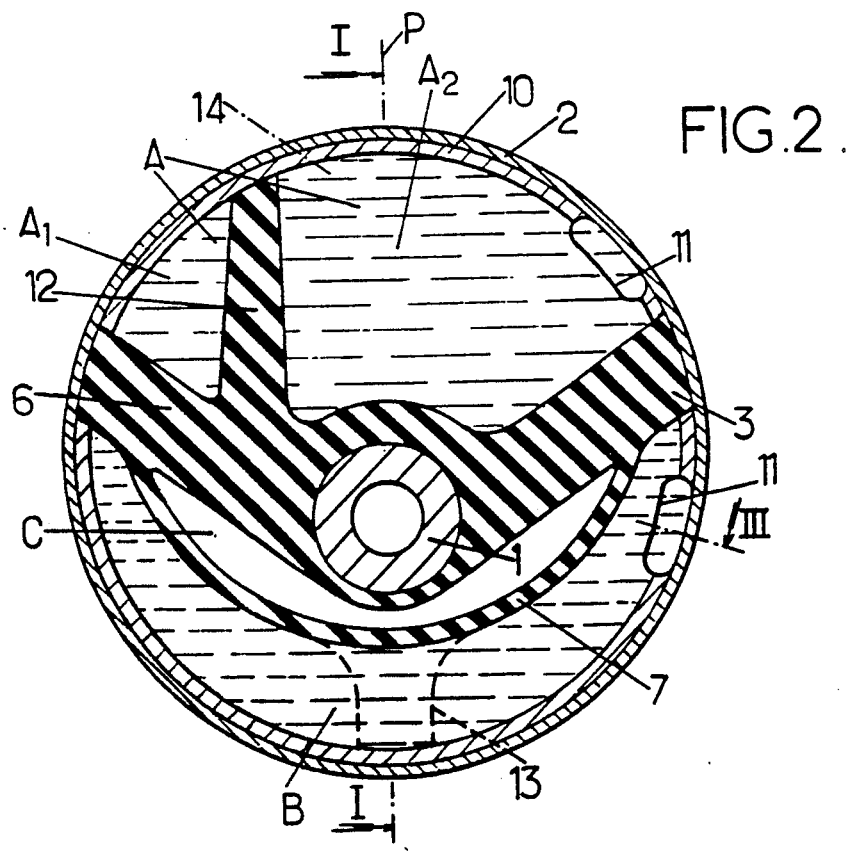

This portion also comprises two radial arms 6 which are diametrically opposite or extend in a widely open V as can be seen in FIG. 2, which arms define chamber A with faces 5 and the external frame 2.

The portion of body 3 which defines chamber B is formed by a thin flexible membrane 7.

This membrane is in the form of a strip curved in a semi-circle and bulging slightly towards the axis. This strip has two semi-circular edges connected sealingly to the external frame 2 and the two ends of said strip considered in the circumferential direction are connected to the radial arms 6, a pocket C open axially to the free air being thus formed between these arms and membrane 7.

Two circular profiled parts 8 are fixed to the two axial ends of the external frame 2, inside this frame, so as to form therewith two narrow circular channels 9.

In the embodiment illustrated, each profiled part 8 has in axial half section the form of a radially outwardly open U and comprises a disc $8_1$ projecting slightly outwardly and crimped between an inwardly bent edge $2_1$ of an axial end of the external frame 2 and the facing end edge of a cylindrical apertured sleeve 10 forming a spacer and introduced jointingly in this frame.

This sleeve 10 envelops jointingly the two profiled parts 8 so as to close them sealingly radially outwardly.

Said sleeve is not continuous over the whole of its circumferential extent, but is formed of two curved pieces or tiles between which the ends of arms 6 are disposed, as can be seen in FIG. 2.

As can also be seen in FIG. 2, each of the two channels 9 opens laterally through orifices 11 into respectively the two chambers A and B.

Instead of chamber A being a single chamber and instead of the two channels opening into this chamber A being identical, as in prior constructions,
here chamber A is divided into two compartments $A_1$ and $A_2$ by adding very simply to the elastomer body 3 a web 12 extending between a central portion of body 3 and the external frame 2 or more precisely sleeve 10,
the two channels 9 are caused to open into respectively these two chambers $A_1$ and $A_2$,
and the dimensions of these two channels are given values corresponding to the optimum damping of oscillations corresponding to respectively two separate frequencies.

These two frequencies are advantageously:
a first frequency $F_1$ of about 5 to 15 Hz corresponding to the "hash", namely vibrations created by the irregularities of the ground over which the vehicle considered is moving, which phenomenon it is advantageous to damp as much as possible,
and a second frequency $F_2$ of about 25 to 35 Hz corresponding to vibrations due to the operation of the slow running engine when the vehicle is stopped, for which vibrations it is advantageous to create a minimum rigidity or stiffness.

The two orifices 11 through which each channel 9 opens respectively into chamber B and into compartment $A_1$ or $A_2$ may be spaced apart angularly from each other about the axis of the sleeve through any desirable angle, this angle being for example about 45° as illustrated, but able to be much greater and even greater than 180° or 270°.

Since each profiled part 8 extends here over a complete circle, plugs (not shown) are fitted into this profiled part to define the ends of channels 9.

In FIG. 2, only the mouths 11 of channel 9 serving compartment $A_2$ can be seen, this channel being housed in the right hand profiled part 8 of FIG. 1: the other channel 9, serving compartment $A_1$, is housed in the left hand profiled part of said FIG. 1, and its mouths in said compartment $A_1$ are therefore not visible in FIG. 2.

The frequencies $F_1$ and $F_2$ may be readily adjusted by adjusting the positions of the plugs which define the ends of channels 9 and/or the extents and positions of mouths 11.

In a variant, the two channels 9 could be formed by two separate sections of the same profiled part 8, these two sections opening into chamber B through the same orifice 11.

One at least of the two channels 9 could extend over more than 360°, this channel then being, in particular, in the form of a helix.

The two compartments $A_1$ and $A_2$ could have identical volumes symmetrical with each other with respect to a plane which could be the axial bisector plane P of the wide V formed by arms 6 in cross section (FIG. 2), or else the transverse bisector plane Q of the V or U defining the internal face of the above chamber A along an axial section (FIG. 1), the web 12, of a general flat shape, then having its mean plane merging with said plane P or Q.

But said mean plane of web 12 may also be parallel to one of these planes or slanted with respect to one of said two planes, while preferably remaining axial or transversal.

In the embodiment illustrated, the volumes of the two compartments $A_1$ and $A_2$ are different: it can be seen in FIG. 2 that the mean plane of web 12, of a generally flat shape, is substantially parallel to the above plane P, but offset with respect to this plane.

Following which and whatever the embodiment adopted, a hydraulic antivibratory sleeve is finally obtained whose construction and advantages are sufficiently clear from the foregoing.

As is evident, and as it follows moreover already from what has gone before, the invention is in no way limited to those of its modes of application and embodiments which have been more especially considered; it embraces, on the contrary, all variants thereof, particularly those in which the second chamber B is divided, like chamber A, into two compartments served respectively by the two channels 9, particularly by means of an intermediate partition 13 moulded integrally with body 3 and extending parallel to the axis of the sleeve and radially from the central portion of the membrane 7 as far as the external tubular frame 2 or sleeve 10 which lines this frame on the inside.

We claim:

1. A hydraulic antivibratory sleeve comprising two rigid tubular frames, one surrounding the other, and joined together by an elastomer body shaped so as to form therewith first and second diametrically opposite sealed pockets which communicate with each other through narrow channel means, said first sealed pocket being under a load, the assembly of said pockets and said narrow channel means being filled with a damping liquid, the portion of the elastomer body which defines the first pocket having in axial section the general form of a radially outwards open U or V, the second pocket being diametrically opposite to said first pocket and being defined by a flexible membrane, said flexible membrane being capable of deforming in response to pressure from damping liquid in said second sealed pocket, the narrow channel means being formed of at least two narrow distinct channels, at least a part of each channel extending along a transverse arc of a circle having at its axis the axis of the external tubular frame, each arc being situated close to said external tubular frame and close to an axial end of said external tubular frame, wherein the first pocket is divided into two independent compartments, into which the two narrow distinct channels open, respectively, and wherein the dimensions of each of these two channels, which dimensions correspond to optimum damping of oscillations of a given frequency, are such that the values of these frequencies are different for the two narrow distinct channels.

2. A sleeve according to claim 1, wherein the two independent compartments of the first pocket are separated by a sealed web which is integrally moulded with the said elastomer body and which extends from a central zone of this elastomer body to the said external tubular frame.

3. A sleeve according to claim 2, wherein the sealed web is generally flat with a mean plane thereof being substantially parallel to the axis of the sleeve.

4. A sleeve according to claim 2, wherein the sealed web is generally flat and a mean plane thereof extends substantially perpendicular to the axis of the sleeve.

5. A sleeve according to claim 1, wherein the second pocket is also divided into two compartments, into which the two channels open, respectively.

6. A sleeve according to claim 5, wherein the second pocket is divided by a sealed web moulded integrally with the elastomer body and extending from a central portion of this body to the external tubular frame.

* * * * *